United States Patent [19]
Harrell

[11] 3,902,139

[45] Aug. 26, 1975

[54] TEMPERATURE COMPENSATED PULSE GENERATOR

[75] Inventor: John W. Harrell, Duncanville, Tex.

[73] Assignee: Mobil Oil Corporation, New York, N.Y.

[22] Filed: Jan. 14, 1974

[21] Appl. No.: 433,028

[52] U.S. Cl. .............. 331/108 D; 307/228; 307/229; 307/271; 328/127; 331/135; 331/143; 331/176; 331/177 R

[51] Int. Cl. ..... H03b 5/12; H03b 3/00; H03k 1/10; 331 108 D;135;143;176;177 R

[58] Field of Search .................... 307/228, 229, 271; 328/127

[56] References Cited

UNITED STATES PATENTS

| | | | |
|---|---|---|---|
| 3,419,784 | 12/1968 | Winn | 307/271 |
| 3,449,695 | 6/1969 | Marsh | 307/271 |
| 3,482,116 | 12/1969 | James | 328/127 |
| 3,504,267 | 3/1970 | James et al. | 328/127 |
| 3,539,825 | 11/1970 | Hardaway | 307/271 |
| 3,560,864 | 2/1971 | Nihof | 328/127 |
| 3,564,428 | 2/1971 | Demark | 328/127 |
| 3,656,066 | 4/1972 | Reynal | 331/135 |
| 3,736,528 | 5/1973 | Acker et al. | 331/143 |
| 3,742,379 | 6/1973 | McLean | 331/143 |
| 3,749,942 | 7/1973 | Moses | 307/271 |
| 3,764,831 | 10/1973 | Zwitter et al. | 307/271 |
| 3,835,419 | 9/1974 | Milne et al. | 307/271 |
| 3,836,791 | 9/1974 | Galloway | 328/127 |
| 3,842,371 | 10/1974 | Kelley | 331/143 |

*Primary Examiner*—Stanley D. Miller, Jr.
*Attorney, Agent, or Firm*—C. A. Huggett; George W. Hager, Jr.

[57] ABSTRACT

In a voltage-controlled pulse generator, a summing integrator provides a ramping output voltage at a rate proportional to the summation of a first input current from a reference voltage source and a second input current from a variable voltage source. A comparator provides an output pulse when the integrator output has ramped from an initial level to a fixed reference level. This output pulse operates a switch which provides a third input current to the integrator which resets its output voltage to its initial voltage level. The basic frequency of the output pulses is set by the first current flow from the reference voltage source and may be changed by varying the variable voltage source to change the second current flow.

2 Claims, 2 Drawing Figures

TEMPERATURE COMPENSATED PULSE GENERATOR

BACKGROUND OF THE INVENTION

This invention relates generally to a pulse generator for providing a train of output pulses at a frequency which is controlled by means of a variable input voltage.

In the past, pulse generators have been employed to provide an output representative of the absolute value of a measured condition. Generally, a transducer is employed to convert the measured condition into a variable voltage source which, as the voltage varies in response to variations in the measured condition, directly controls the frequency of the pulse generator.

SUMMARY OF THE INVENTION

A pulse generator provides output pulses at a basic frequency which may be varied in response to a variable control voltage. A first reference voltage source and a variable voltage source both provide current flow to the input of a summing amplifier. An integrator provides an output which ramps from an initial voltage level toward a second reference voltage at a rate proportional to the summation of the two current flows at its input. A comparator produces a pulse output when the output of the integrator reaches the level of the second reference voltage. This pulse output of the comparator resets the integrator to its initial voltage level from which it again ramps toward the second voltage level and another output pulse is produced by the comparator when such level is again reached. The frequency of these output pulses are, consequently, proportional to the summation of the two current flows from the first reference voltage source and the variable voltage source.

In a further aspect, the output pulse of the comparator operates to close a switch which then applies a third current flow to the input of the summing integrator. This third current flow is opposite in direction to the other two current flows to the input of the integrator and is sufficiently greater than these other two current flows that it causes the integrator to ramp in an opposite direction from the ramping caused by the other two current flows. The integrator ramps in this opposite direction and is reset to its initial output voltage level. The switch is then opened and this third current flow is removed from the input to the integrator.

In a still further aspect, frequency stability of the output pulses of the comparator is achieved under varying temperature conditions by utilizing a positive-temperature coefficient resistance in one or more of the three current flow paths to the input of the integrator.

DESCRIPTION OF THE PREFERRED EMBODIMENT

In accordance with the present invention a new and improved pulse generator provides output pulses at a basic frequency which may be increased or decreased by means of a variable input voltage. The pulse generator is temperature compensated to provide for frequency stability of its output pulses under varying environmental conditions such as might be encountered in logging operations within a borehole.

Figure 1:
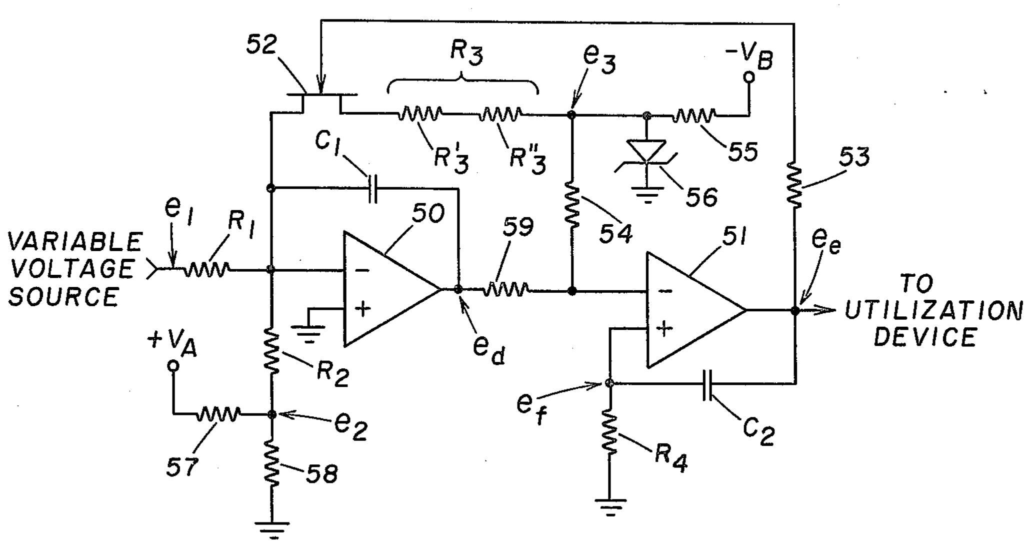
FIG. 1 is a detailed electrical schematic of the present invention.

In FIG. 1 there is shown in schematic form the voltage-controlled pulse generator of the present invention comprising an integrator 50, a comparator 51, and an electronic switch 52. The integrator 50 is an operational amplifier which functions as a summing-type integrator to provide the signal $e_d$ which is defined by the following equation:

$$e_d = -\frac{1}{R_1C_1}\int_{t_1}^{t_2} e_1 dt - \frac{1}{R_2C_1}\int_{t_1}^{t_2} e_2 dt - \frac{1}{(R_3+R_S)C_1}\int_{0}^{t_1} e_3 dt \qquad (1)$$

where, $e_1$ = the control signal from a variable voltage source, $e_2$ = a positive reference voltage selected to set the basic frequency of the voltage-controlled pulse generator when $e_1$ is zero, $e_3$ = a negative reference voltage switched to the input of integrator 50 by the switch 52 to reset its output to a predetermined positive level determined by the characteristics of the comparator 51, and $R_S$ = resistance of switch 52.

The comparator 51 is an operational amplifier which compares the signal $e_d$ to the negative reference voltage $e_3$ to provide for the output signal $e_c$. Signal $e_c$ is defined by the following:

$$e_c = [e_f - (e_3 + e_d)]\, A_o \qquad (2)$$

where, $e_f$ = positive feedback of comparator 51 through capacitor $C_2$ and resistor $R_4$, and $A_o$ = open loop gain of comparator 51.

Figure 2:
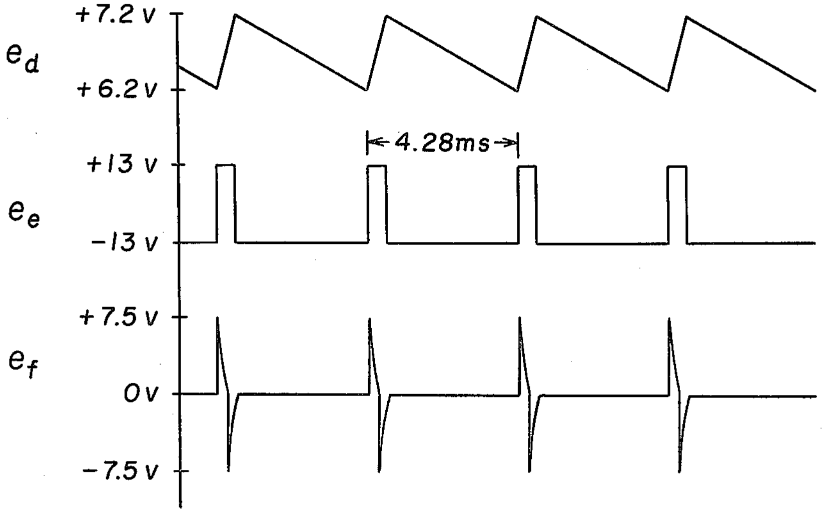
FIG. 2 illustrates the waveforms of the various signals appearing at the designated points in the electrical schematic of FIG. 1.

More particularly, when power is initially applied to the voltage-controlled pulse generator, the signal $e_c$ of comparator 51 becomes a pulse of positive voltage, as illustrated in FIG. 2, sufficient to turn switch 52 ON through resistor 53. Switch 52 is a field effect transistor which when turned ON applies the current developed by $e_3$ through resistor $R_3$ and the inherent saturation resistance $R_S$ of the field effect transistor itself to the input of the integrator 50. Voltage $e_3$ is provided by the resistor 55 and the Zener diode 56 in series with the power supply $-V_B$. This current is substantial in comparison to the currents generated by $e_1$ through resistor $R_1$ and $e_2$ through resistor $R_2$, thereby causing the signal $e_d$ of integrator 50 to ramp positive, as illustrated in FIG. 2, at a rate determined by the expression of Equation (1).

When $e_d$ becomes greater than $e_3$, the comparator 51 switches its output signal $e_c$ to a negative voltage sufficient to turn switch 52 OFF. This removes $e_3$ from being input to the integrator 50. Consequently, the integrator's output $e_d$ ramps negative at the rate determined by $e_1$ and $e_2$ in Equation (1). It will be remembered that $e_1$ is the control voltage supplied from a variable voltage source, while $e_2$ is the positive reference voltage supplied by the voltage divider resistors 57 and 58 in series with the power supply $+V_A$. With no control voltage input, that is, with $e_1$ equal to zero, the current flow from the positive reference voltage $e_2$ through the resistor $R_2$ sets the basic frequency of the output pulses $e_e$. When a positive control voltage $e_1$ is provided, the current flow through resistor $R_1$ increases the current input to the integrator 50 and thereby increases the basic frequency of the output pulses $e_e$. Conversely, a negative control voltage $e_1$ provides a current flow through resistor $R_1$ that decreases the current input to the integrator 50 and thereby decreases the basic frequency of the output pulses $e_e$. Upon $e_d$ becoming less than $e_3$, the comparator again switches its output signal $e_e$ to a pulse of positive voltage sufficient to turn switch 52 ON. In this manner the frequency of the output signal is representative not only of the magnitude of the control voltage $e_1$ but also of the sign of the control voltage $e_1$.

Frequency stability of the pulses of the output signal $e_e$ is often important in operations such as logging while drilling where changes in the borehole environmental conditions can cause nominal values of the circuit components in the voltage-controlled pulse generator to drift, thereby causing the frequency of the integrator output $e_d$ to drift. Such drifts due to temperature variations can be attributed to leakage currents of the field effect transistor 52, the temperature coefficient of the Zener diode 56, and changes in the values of the resistors and capacitors. These drifts are cumulative and in a direction that decreases the output pulse frequency of signal $e_e$ as the temperature increases. However, if the resistance $R_3$ in series with the field effect transistor 52 is increased as the temperature increases, the output pulse frequency of signal $e_e$ will be increased. Accordingly, one embodiment of the present invention utilizes for the resistance $R_3$ a fixed resistor $R_3'$ and a positive-temperature coefficient resistor, or sensistor, $R_3''$ whose resistance changes linearly with changes in temperature. In accordance with one such embodiment in which the input control voltage $e_1$ varied from 3 volts to 13 volts, a frequency stability of 0.25 percent was obtained over a temperature range of 25°C. to 125°C. with the following specific types and values of circuit components:

| Reference Designation | Description |
|---|---|
| Operational amplifiers 50 and 51 | 1556 (Motorola) |
| Field effect transistor 52 | 2N4857 (Motorola) |
| Zener diode 56 | 1N823 (Motorola) |
| Sensistor $R_3''$ | TM ¼-150Ω(Texas Instruments) |
| Capacitor $C_1$ | 0.1 μf |
| Capacitor $C_2$ | 330 pf |
| Resistor $R_3'$ | 1.2 K |
| Resistor $R_1$ | 719 K |
| Resistor $R_2$ | 499 K |
| Resistors $R_4$ and 53 | 10 K |
| Resistor 57 | 2 K |
| Resistor 58 | 5.1 K |
| Resistors 54 and 59 | 20 K |
| Resistor 55 | 1.8 K |
| Voltage source $V_A$ | +15 VDC |
| Voltage source $V_B$ | −15 VDC |

With the foregoing selected circuit components and a voltage control input of 10 volts, for example, the signals $e_d$, $e_e$, and $e_f$ are as illustrated in FIG. 2 with the output pulses represented by $e_e$ being at a frequency of 234 cycles per second.

It should be understood that the foregoing description relates to only a preferred embodiment of the invention and that modifications or alterations may be made without departing from the spirit and scope of the invention as set forth in the appended claims. For example, compensation for frequency drift of the output pulses of signal $e_e$ under varying temperature conditions may be also carried out by utilizing positive-temperature coefficient resistances for either or both of the resistors $R_1$ and $R_2$ in lieu of or in addition to resistor $R_3$. In this manner, any one or any combination of the three input currents to the integrator 50 is varied with temperature so as to maintain the ramping rates of the integrator free from changes due to varying temperature conditions.

I claim:

1. A pulse generator comprising:

a. a summing integrator, b. means for providing a reference current to the input of said summing integrator, c. means for providing a variable current to the input of said summing integrator, whereby the output of said integrator ramps in a first direction at a rate proportional to the summation of said reference and variable currents at its input, d. means responsive to the ramping output of said integrator for providing a pulse when said output reaches a first predetermined voltage level, and e. means responsive to said pulse for providing a third current to the input of said integrator opposite in direction to said reference and variable currents and sufficiently greater than the summation of said reference and variable currents such that the output of said integrator ramps in a second direction opposite to that of said first direction at a rate proportional to said third current, said means varying said third current linearly with temperature variations to change the rate at which said integrator ramps in said second direction, thereby compensating for drifts in the frequency of said pulses under temperature variations.

2. The pulse generator of claim 1 wherein said means for providing said third current comprises:

a. a second reference voltage source, b. a switch which operates in response to said pulses, said switch being closed during the period of each of said pulses, and c. a positive temperature coefficient resistance connecting said second reference voltage source to the input of said integrator in response to the closing of said switch.

* * * * *